United States Patent
Kouno et al.

(10) Patent No.: US 10,139,248 B2
(45) Date of Patent: *Nov. 27, 2018

(54) POSITION SENSING APPARATUS

(71) Applicant: DENSO CORPORATION, Kariya, Aichi-pref. (JP)

(72) Inventors: Naoaki Kouno, Chiryu (JP); Tetsuji Yamanaka, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/650,025

(22) Filed: Jul. 14, 2017

(65) Prior Publication Data

US 2017/0314964 A1 Nov. 2, 2017

Related U.S. Application Data

(63) Continuation of application No. 14/576,568, filed on Dec. 19, 2014, now Pat. No. 9,739,638.

(30) Foreign Application Priority Data

Dec. 27, 2013 (JP) .................................. 2013-271729
Oct. 8, 2014 (JP) .................................. 2014-207126

(51) Int. Cl.
  *G01D 5/14* (2006.01)
(52) U.S. Cl.
  CPC .................................. *G01D 5/145* (2013.01)
(58) Field of Classification Search
  CPC .......... G01D 5/145; G01D 5/147; G01D 5/12; G01D 5/14; G01D 5/24433; G01D 5/2013; G01D 5/20; G01D 5/24476; G01D 5/24485; G01D 11/245; G01D 3/06; G01D 3/02; G01D 3/036; G01D 15/00; G01D 1/00; G01B 7/30; G01B 7/003; G01B 7/14; G01B 7/023; G01B 7/06; F02D 2009/0294; F02D 9/105; F02D 11/106; B60G 2401/17; B60G 2401/172; F16C 41/007; G01R 33/072; H03K 2217/94068

(Continued)

(56) References Cited

U.S. PATENT DOCUMENTS 4,810,965 A   3/1989 Fujiwara et al.
5,757,179 A * 5/1998 McCurley ................ G01B 7/30
                                                123/617

(Continued)

FOREIGN PATENT DOCUMENTS

JP   08-292004   11/1996
JP   2009-085913  4/2009

OTHER PUBLICATIONS

Kuroda et al., U.S. Appl. No. 14/576,612, filed Dec. 19, 2014 (now U.S. Pat. No. 9,309,806, dated Apr. 12, 2016).

*Primary Examiner* — Lee Rodak
(74) *Attorney, Agent, or Firm* — Nixon & Vanderhye P.C.

(57) ABSTRACT

Each of a first yoke and a second yoke has an intermediate portion between one end portion and the other end portion of the yoke. When the first and second yokes are viewed in an opposing direction, a width of the intermediate portion of each yoke, which is measured in a direction perpendicular to a rotational direction, is smaller than a width of the one end portion and a width of the other end portion of the yoke and is constant along an entire extent of the intermediate portion in the rotational direction.

13 Claims, 10 Drawing Sheets

(58) Field of Classification Search
USPC ...... 324/251, 207.11–207.26, 252, 173, 174, 324/249; 338/32 R, 32 H
See application file for complete search history.

(56) References Cited

U.S. PATENT DOCUMENTS

| | | | |
|---|---|---|---|
| 6,222,359 B1* | 4/2001 | Duesler | G01D 5/145 324/207.12 |
| 6,498,480 B1* | 12/2002 | Manara | F02P 7/07 123/617 |
| 6,731,109 B2 | 5/2004 | Johnson et al. | |
| 6,753,680 B2 | 6/2004 | Wolf | |
| 6,992,478 B2 | 1/2006 | Etherington et al. | |
| 6,998,838 B2 | 2/2006 | Lin | |
| 7,151,369 B1 | 12/2006 | Wolf | |
| 7,242,183 B2 | 7/2007 | Recio et al. | |
| 7,463,023 B1 | 12/2008 | Moreno et al. | |
| 2001/0030534 A1* | 10/2001 | Apel | G01D 5/145 324/207.2 |
| 2002/0118011 A1* | 8/2002 | Wolf | G01B 7/003 324/207.2 |
| 2003/0076088 A1 | 4/2003 | Apel et al. | |
| 2004/0008025 A1* | 1/2004 | Johnson | G01D 5/145 324/207.2 |
| 2006/0208728 A1* | 9/2006 | Wolf | G01D 5/147 324/207.25 |
| 2009/0295377 A1 | 12/2009 | Moreno et al. | |
| 2012/0126796 A1 | 5/2012 | Drespling et al. | |
| 2014/0103911 A1 | 4/2014 | Honda et al. | |
| 2014/0184205 A1 | 7/2014 | Kouno et al. | |

\* cited by examiner

POSITION SENSING APPARATUS

CROSS REFERENCE TO RELATED APPLICATION

This application is a continuation of U.S. application Ser. No. 14/576,568, filed Dec. 19, 2014, which is based on Japanese Patent Application No. 2013-271729, filed on Dec. 27, 2013, and Japanese Patent Application No. 2014-207126, filed on Oct. 8, 2014, the disclosures of which are incorporated herein by reference.

TECHNICAL FIELD

The present disclosure relates to a position sensing apparatus, which senses a position of a sensing subject.

BACKGROUND

A known magnetic position sensing apparatus senses a position of a sensing subject, which moves relative to a reference member. This type of position sensing apparatus includes two magnets, two yokes (magnetic flux conducting members) and a magnetic flux density sensing device (magnetic flux sensing means). The magnets and the yokes form a closed magnetic circuit. The magnetic flux density sensing device is, for example, a Hall element that is installed in an inside of the closed magnetic circuit. For example, the magnets and the yokes are installed to the sensing subject, and the magnetic flux density sensing device is installed to the reference member. A density of the magnetic flux, which passes through the magnetic flux density sensing device, changes in response to a position of the magnetic flux density sensing device relative to the yokes. The position sensing apparatus senses the position of the sensing subject based on the density of the magnetic flux, which passes through the magnetic flux density sensing device.

For example, a position sensing apparatus disclosed in JP2009-085913A senses a rotational angle of a sensing subject, which rotates relative to a reference member. In the position sensing apparatus, two yokes extend in parallel with each other in a rotational direction of the sensing subject and are opposed to each other in a direction, which is referred to as an opposing direction. When the yokes are viewed in the opposing direction, a width of each yoke progressively decreases from each of two end portions of the yoke toward a center of the yoke. With this construction, a leakage magnetic flux, which is present in a gap between the yokes, is increased, and thereby it is possible to improve linearity of an output signal of the magnetic flux density sensing apparatus, i.e., it is possible to approximate a relationship between the rotational angle of the sensing subject and the output voltage of the magnetic flux density sensing device to a linear relationship.

The width of the center portion of the yoke, which is located in the center in the rotational direction, is relatively small in comparison to the width of the end portions of the yoke, which are opposite to each other in the rotational direction. Therefore, the position sensing apparatus of JP2009-085913A is vulnerable to the disturbance caused by an external magnetic field. Thereby, in order to avoid the influence of the external magnetic field, the width of the center portion of the yoke cannot be reduced from a predetermined minimum width, which is required to provide sufficient resistivity against the disturbance. Thus, there is a limit with respect to the increase of the amount of the leakage magnetic flux in the gap between the yokes. Furthermore, in a case where the width of the center portion of the yoke, which is designed to provide a good linearity of the output signal of the magnetic flux density sensing device, is smaller than the predetermined minimum width, which is required to provide the sufficient resistivity against the disturbance, the width of the center portion of the yoke has to be changed while sacrificing the linearity of the output signal.

Furthermore, it is difficult to design and manufacture the yoke that has the width, which progressively changes.

SUMMARY

The present disclosure is made in view of the above disadvantages.

According to the present disclosure, there is provided a position sensing apparatus for sensing a position of a sensing subject, which moves relative to a reference member. The position sensing apparatus includes a first magnetic flux conducting member, a second magnetic flux conducting member, a first magnetic flux generator, a second magnetic flux generator, and a magnetic flux density sensing device. The first magnetic flux conducting member extends in a moving direction of the sensing subject. The second magnetic flux conducting member extends in the moving direction of the sensing subject in parallel with the first magnetic flux conducting member. The first magnetic flux conducting member and the second magnetic flux conducting member are installed to one of the reference member and the sensing subject. The first magnetic flux generator is placed between one end portion of the first magnetic flux conducting member and one end portion of the second magnetic flux conducting member. The second magnetic flux generator is placed between another end portion of the first magnetic flux conducting member, which is opposite from the one end portion of the first magnetic flux conducting member in the moving direction of the sensing subject, and another end portion of the second magnetic flux conducting member, which is opposite from the one end portion of the second magnetic flux conducting member in the moving direction of the sensing subject. The magnetic flux density sensing device is placed in a gap between the first magnetic flux conducting member and the second magnetic flux conducting member and is installed to the other one of the reference member and the sensing subject. The magnetic flux density sensing device outputs an output signal, which corresponds to a density of the magnetic flux that passes through the magnetic flux density sensing device. The first magnetic flux conducting member and the second magnetic flux conducting member are opposed to each other in a predetermined direction that is defined as an opposing direction. The first magnetic flux conducting member has a first intermediate portion that is located between the one end portion and the another end portion of the first magnetic flux conducting member. When the first magnetic flux conducting member is viewed in the opposing direction, a width of the first intermediate portion, which is measured in a direction perpendicular to the moving direction of the sensing subject, is smaller than a width of the one end portion and a width of the another end portion of the first magnetic flux conducting member, which are measured in the direction perpendicular to the moving direction of the sensing subject. The width of the first intermediate portion is constant along an entire extent of the first intermediate portion in the moving direction of the sensing subject. The second magnetic flux conducting member has a second intermediate portion that is located between the one end portion and the another end portion of the second magnetic flux conducting member. When the second magnetic flux conducting member is viewed in the opposing direction, a width of the second intermediate portion, which is measured in the direction perpendicular to the moving direction of the sensing subject, is smaller than a width of the one end portion and a width of the another end portion of the second magnetic flux conducting member, which are measured in the direction perpendicular to the moving direction of the sensing subject. The width of the second intermediate portion is constant along an entire extent of the second intermediate portion in the moving direction of the sensing subject.

BRIEF DESCRIPTION OF THE DRAWINGS

The drawings described herein are for illustration purposes only and are not intended to limit the scope of the present disclosure in any way.

FIG. 14 is a view taken in a direction of an arrow XIV in FIG. 13;

DETAILED DESCRIPTION

Various embodiments of the present disclosure will be described with reference to the accompanying drawings. In the following discussion of the embodiments, similar components will be indicated by the same reference numerals and will not be described redundantly for the sake of simplicity.

First Embodiment

Figure 1:
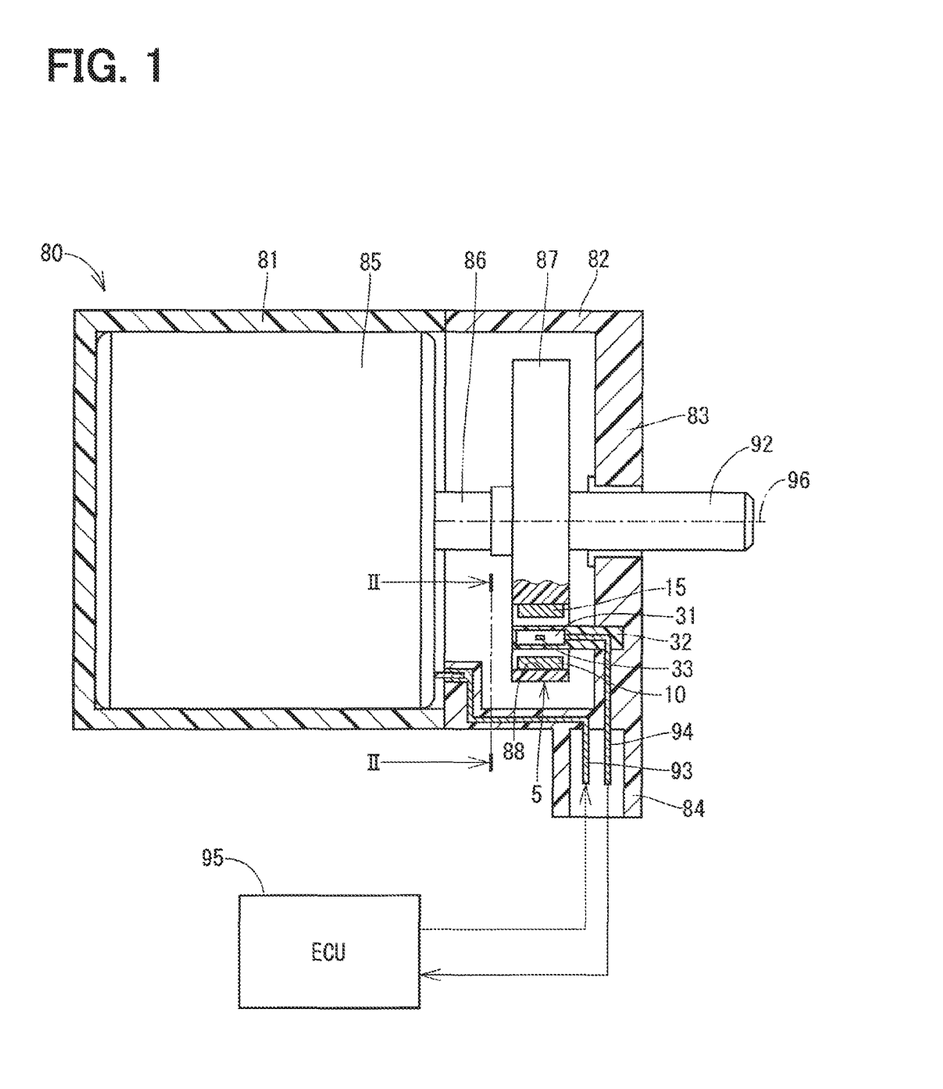
FIG. 1 is a schematic cross-sectional view of a rotational drive apparatus, in which a position sensing apparatus according to a first embodiment of the present disclosure is applied.

A position sensing apparatus according to a first embodiment of the present disclosure is installed in a rotational drive apparatus shown in FIG. 1. The rotational drive apparatus 80 is used to open and close a waste gate valve (not shown). In a supercharged internal combustion engine provided with a turbocharger, the waste gate valve adjusts a flow quantity of exhaust gas of the engine supplied to a turbine of the turbocharger by opening and closing a bypass passage that bypasses the turbine.

First of all, a structure of the rotational drive apparatus 80 will be described with reference to FIG. 1. The rotational drive apparatus 80 includes a housing 81, a case 82, an electric motor (hereinafter simply referred to as a motor) 85, a rotatable body 87, an output shaft 92, and the position sensing apparatus 5.

The housing 81 has a motor receiving chamber and is fixed to a body of a vehicle (e.g., an automobile) or a member that is installed to the body of the vehicle.

The case 82 includes a cover portion 83 and a connector portion 84. The cover portion 83 is fixed to an opening of the housing 81, and the connector portion 84 projects outwardly from the cover portion 83.

The motor 85 is received in the housing 81 and is electrically connected to an electronic control unit (ECU) 95, which is also referred to as an electronic control device, through power terminals 93. The motor 85 drives a motor shaft 86 to rotate the same when an electric power is supplied from the electronic control unit 95 to the motor 85.

The rotatable body 87 is a circular plate member that is coaxial with the motor shaft 86. The rotatable body 87 has a through-hole 88. The through-hole 88 is formed at a location, which is radially outwardly displaced from a rotational axis 96, and the through-hole 88 is configured into an arcuate form that extends in a circumferential direction. The rotatable body 87 is connected to the motor shaft 86 in a manner that enables transmission of rotation from the motor shaft 86 to the rotatable body 87.

The output shaft 92 is coaxial with the motor shaft 86 and is rotatably supported by the case 82. The output shaft 92 is connected to the rotatable body 87 in a manner that enables transmission of the rotation from the rotatable body 87 to the output shaft 92. The output shaft 92 is connected to a waste gate valve through a link mechanism (not shown).

The position sensing apparatus 5 is placed at a location, which coincides with a location of the rotatable body 87 in an axial direction and is displaced from the rotational axis 96 in a radial direction. The case 82 serves as a reference member of the present disclosure, and the rotatable body 87 serves as a sensing subject of the present disclosure. The position sensing apparatus 5 is electrically connected to the electronic control unit 95 through signal terminals 94.

When the electric power is supplied from the electronic control unit 95 to the rotational drive apparatus 80, the rotational drive apparatus 80 rotates the output shaft 92 through the motor 85 and outputs a voltage, which corresponds to a rotational angle of the rotatable body 87, from the position sensing apparatus 5 to the electronic control unit 95. The electronic control unit 95 drives the motor 85 based on the output voltage of the position sensing apparatus 5 and performs a feedback control operation such that a rotational angle of the rotatable body 87 coincides with a target value.

Next, a basic structure of the position sensing apparatus 5 will be described with reference to FIGS. 1 and 2.

The position sensing apparatus 5 includes a first yoke 10, a second yoke 15, a first magnet (also referred to as a first permanent magnet) 25, a second magnet (also referred to as a second permanent magnet) 26, and a short-circuit magnetic path portion 30.

The first yoke 10 is made of a magnetic material and extends in a rotational direction of the rotatable body 87 along an inner wall (radially outer side inner wall) 89 of the through-hole 88 of the rotatable body 87, which is located on a radially outer side. The first yoke 10 is fixed to the rotatable body 87 and serves as a first magnetic flux conducting member of the present disclosure. The first yoke 10 is configured into an arcuate form that arcuately extends in the rotational direction.

Hereinafter, the term "rotational direction" is used to refer the rotational direction of the rotatable body 87. The rotational direction serves as a moving direction of the present disclosure.

The second yoke 15 is made of a magnetic material and extends in the rotational direction in parallel with the first yoke 10 along an inner wall (radially inner side inner wall) 91 of the through-hole 88 of the rotatable body 87, which is located on a radially inner side. The second yoke 15 is fixed to the rotatable body 87 and serves as a second magnetic flux conducting member of the present disclosure. The second yoke 15 is configured into an arcuate form that arcuately extends in the rotational direction.

The first magnet 25 is placed between and is directly held between one end portion 11 of the first yoke 10 and one end portion 16 of the second yoke 15. The first magnet 25 serves as a first magnetic flux generator of the present disclosure. A magnetizing direction of the first magnet 25 coincides with an opposing direction of the yokes, and a north pole (N-pole) of the first magnet 25 is located on a radially outer side, and a south pole (S-pole) of the first magnet 25 is located on a radially inner side. Hereinafter, the opposing direction will be used to refer a direction, along which the first yoke 10 and the second yoke 15 are opposed to each other. More specifically, the first yoke 10 and the second yoke 15 are opposed to each other in a predetermined direction, and this predetermined direction is defined as and referred to as the opposing direction. In the present embodiment, the opposing direction coincides with the radial direction of the rotatable body 87, i.e., a direction that is perpendicular to the rotational axis 96 of the rotatable body 87.

The second magnet 26 is placed between and is directly held between the other end portion (another end portion) 12 of the first yoke 10, which is opposite from the one end portion 11 of the first yoke 10 in the rotational direction, and the other end portion (another end portion) 17 of the second yoke 15, which is opposite from the one end portion 16 of the second yoke 15 in the rotational direction. A magnetizing direction of the second magnet 26 coincides with the opposing direction of the yokes, and a north pole (N-pole) of the second magnet 26 is located on a radially inner side, and a south pole (S-pole) of the second magnet 26 is located on a radially outer side.

The first yoke 10 and the second yoke 15 are magnetic circuit constituent members, which connect between the first magnet 25 and the second magnet 26. The first yoke 10 and the second yoke 15 form a closed magnetic circuit in cooperation with the first magnet 25 and the second magnet 26. A gap 20, which is configured into an arcuate form extending in the rotational direction, is formed between the first yoke 10 and the second yoke 15.

Magnetic fluxes, which are outputted from the north pole of the first magnet 25, include a return magnetic flux, a leakage magnet flux and a directly-passing magnetic flux. The return magnetic flux, which is outputted from the north pole of the first magnet 25, flows to the south pole of the second magnet 26 through the first yoke 10. The leakage magnetic flux, which is outputted from the north pole of the first magnet 25, flows from the first yoke 10 to the second yoke 15 through the gap 20, which is formed between the first yoke 10 and the second yoke 15. The directly passing magnetic flux, which is outputted from the north pole of the first magnet 25, flows to the south pole of the first magnet 25 through the gap 20 without passing through the first yoke 10 and the second yoke 15.

Magnetic fluxes, which are outputted from the north pole of the second magnet 26, include a return magnetic flux, a leakage magnet flux and a directly-passing magnetic flux. The return magnetic flux, which is outputted from the north pole of the second magnet 26, flows to the south pole of the first magnet 25 through the second yoke 15. The leakage magnetic flux, which is outputted from the north pole of the second magnet 26, flows from the second yoke 15 to the first yoke 10 through the gap 20. The directly-passing magnetic flux, which is outputted from the north pole of the second magnet 26, flows to the south pole of the second magnet 26 through the gap 20 without passing through the first yoke 10 and the second yoke 15.

The short-circuit magnetic path portion 30 includes a Hall IC 31 and a molded member 32. The Hall IC 31 is insert molded in the molded member 32 made of resin. The molded member 32 is fixed to the case 82. The Hall IC 31 includes a Hall element 33. The Hall element 33 is a magneto-electric transducer, which uses a Hall effect. The Hall element 33 outputs a voltage, which corresponds to a density of the magnetic flux that passes through a magnetism sensing surface of the Hall element 33 and serves as a magnetic flux density sensing device of the present disclosure. The density of the magnetic flux, which passes through the Hall element 33, increases or decreases in response to a change in a relative position between the Hall element 33 and the closed magnetic circuit upon rotation of the rotatable body 87.

Next, the characteristic structure of the position sensing apparatus 5 will be described with reference to FIGS. 2 to 5.

Figure 2:
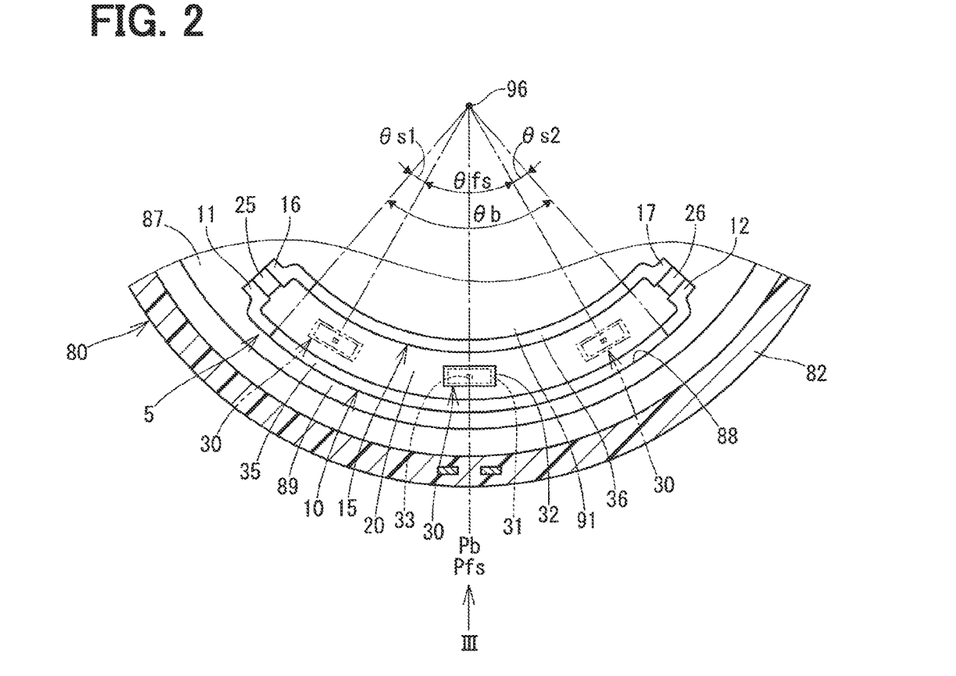
FIG. 2 is a cross-sectional view taken along line II-II in FIG. 1.
Figure 3:
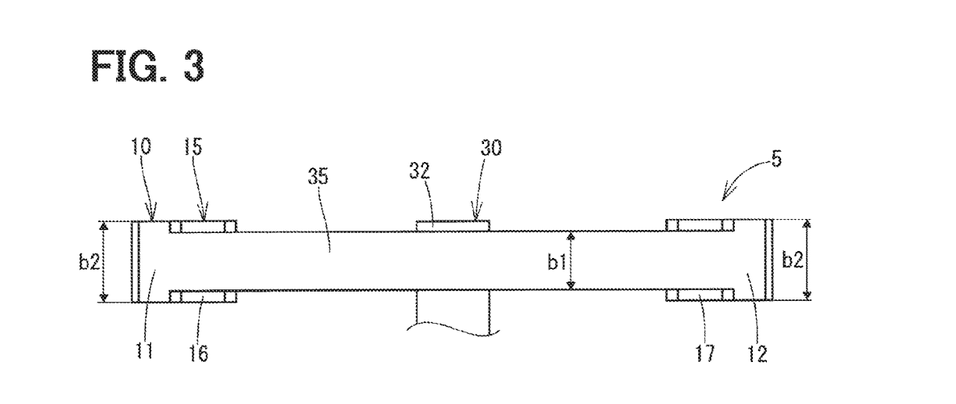
FIG. 3 is a view taken in a direction of an arrow III in FIG. 2.

As shown in FIGS. 2 and 3, the first yoke 10 includes an intermediate portion 35 between the one end portion 11 and the other end portion 12 of the first yoke 10. In the present embodiment, the intermediate portion 35 is directly connected to each of the one end portion 11 and the other end portion 12 in the first yoke 10. When the first yoke 10 is viewed in the opposing direction, a width b1 of the intermediate portion 35, which is measured in a direction (a top-to-bottom direction in FIG. 3) perpendicular to the rotational direction, is smaller than a width b2 of the one end portion 11 and a width b2 of the other end portion 12 of the first yoke 10, which are measured in the direction perpendicular to the rotational direction. The width b1 of the intermediate portion 35 is constant along an entire extent of the intermediate portion 35 in the rotational direction (moving direction). The intermediate portion 35 serves as a first intermediate portion of the present disclosure. Furthermore, the width b2 of the one end portion 11 is constant along an entire extent of the one end portion 11 in the rotational direction, and the width b2 of the other end portion 12 is constant along an entire extent of the other end portion 12 in the rotational direction.

The second yoke 15 includes an intermediate portion 36 between the one end portion 16 and the other end portion 17 of the second yoke 15. In the present embodiment, the intermediate portion 36 is directly connected to each of the one end portion 16 and the other end portion 17 in the second yoke 15. When the second yoke 15 is viewed in the opposing direction, a width b1 of the intermediate portion 36, which is measured in the direction (the top-to-bottom direction in FIG. 3) perpendicular to the rotational direction, is smaller than a width b2 of the one end portion 16 and a width b2 of the other end portion 17 of the second yoke 15, which are measured in the direction perpendicular to the rotational direction. The width b1 of the intermediate portion 36 is constant along an entire extent of the intermediate portion 36 in the rotational direction (moving direction). The intermediate portion 36 serves as a second intermediate portion of the present disclosure. Furthermore, the width b2 of the one end portion 16 is constant along an entire extent of the one end portion 16 in the rotational direction, and the width b2 of the other end portion 17 is constant along an entire extent of the other end portion 17 in the rotational direction.

As shown in FIG. 2, in the present embodiment, a size and an extent of a range, which is occupied by the intermediate portion 35 of the first yoke 10 in the rotational direction, coincide with a size and an extent of a range, which is occupied by the intermediate portion 36 of the second yoke 15 in the rotational direction. Hereinafter, the above range of each of the intermediate portions 35, 36 will be referred to as an intermediate range (also referred to as first and second intermediate ranges of the intermediate portions 35, 36) θb. A range, within which the rotational angle (position) of the rotatable body 87 is sensed in the rotational direction, is defined as a sensing range θfs.

Figure 4:
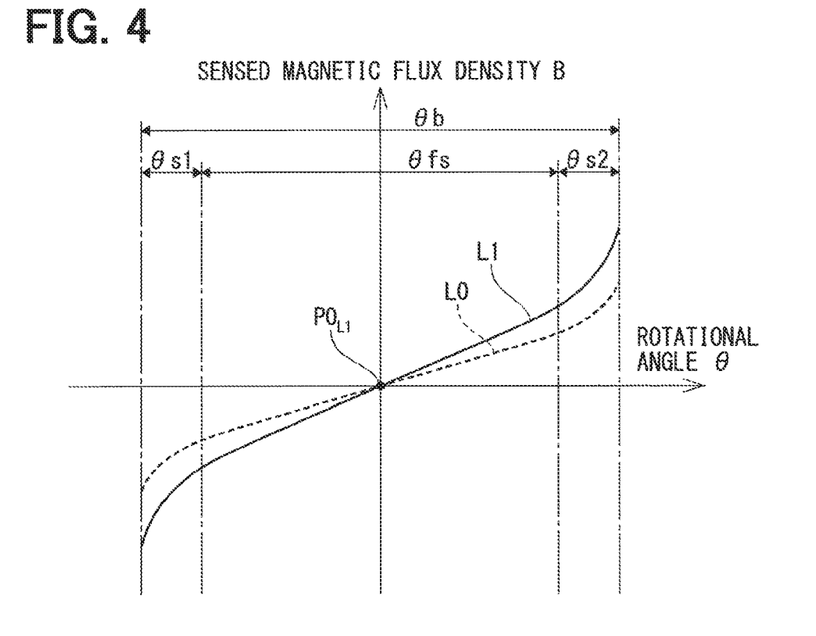
FIG. 4 is a diagram showing a relationship between a rotational angle of a rotatable body shown in FIG. 2 and a density of a magnetic flux, which passes through a Hall element.

FIG. 4 shows a characteristic line L1, which indicates a relationship between the rotational angle θ of the rotatable body 87 and a density B of the magnetic flux passing through the Hall element 33 in an orthogonal coordinate system. The rotational angle θ serves as a position of the sensing subject of the present disclosure. Furthermore, FIG. 5 indicates a characteristic line L2, which indicates a relationship between the rotational angle θ and the output voltage V of the Hall element 33. The output voltage V serves as an output signal of the present disclosure.

In FIG. 4, a coordinate, at which the sensed magnetic flux density B becomes zero (0) on the characteristic line L1, is defined as a zero point $P0_{L1}$. Furthermore, in FIG. 5, a coordinate, which corresponds to the zero point $P0_{L1}$ of FIG. 4 and is located on the characteristic line L2, is defined as a zero point $P0_{L2}$. An ideal straight line L3, which extends through the zero point $P0_{L2}$ and has a slope that is an ideal slope a, is indicated with a dot-dot-dash line in FIG. 5.

Figure 5:
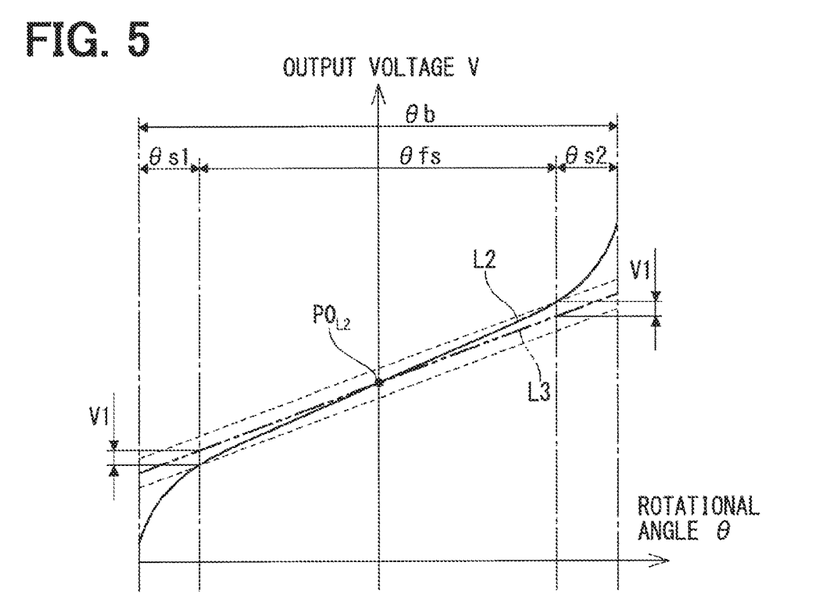
FIG. 5 is a diagram showing a relationship between the rotational angle of the rotatable body shown in FIG. 2 and an output voltage of the Hall element.

In the present embodiment, the intermediate range (the first intermediate range and the second intermediate range) θb is set such that an output voltage difference (output signal difference) between the characteristic line L2 and the ideal straight line L3 is kept to be equal to or smaller than a predetermined value V1. The predetermined value V1 is a value that is determined in view of a required accuracy.

Specifically, the intermediate range θb is set through the following process (A) and process (B) in this order. The intermediate range θb has two non-overlapping ranges, which do not overlap with the sensing range θfs. In the following discussion, one of the non-overlapping ranges is defined as a first excess range (also referred to as a first excess section or a first excess angle) θs1, and the other one of the non-overlapping ranges is defined as a second excess range (also referred to as a second excess section or a second excess angle) θs2.

(A) The sensing range θfs is determined based on an operational angular range of the rotatable body 87.

(B) The width of each of the first yoke 10 and the second yoke 15 rapidly changes at a connection (transition) between the one end portion 11, 16 and the intermediate portion 35, 36 and a connection (transition) between the other end portion 12, 17 and the intermediate portion 35, 36. Therefore, as shown in FIG. 5, the slope of the characteristic line L2 relatively largely changes at the two end ranges (sections) of the intermediate range θb. Therefore, the linearity of the characteristic line L2 at the sensing range θfs can be improved by increasing the first excess range θs1 and the second excess range θs2 as much as possible. In the present embodiment, the first excess range (first excess angle) θs1 and the second excess range (second excess angle) θs2 are determined such that the output voltage difference between the characteristic line L2 in the sensing range θfs and the ideal straight line L3 is kept to be equal to or smaller than the predetermined value V1.

In the present embodiment, the first excess range (first excess angle) θs1 and the second excess range (second excess angle) θs2 are equal to each other. Furthermore, a center position Pfs of the sensing range θfs in the rotational direction (moving direction) coincides with a center position Pb of the intermediate range θb in the rotational direction (moving direction). Furthermore, a magnetic force of the first magnet 25 and a magnetic force of the second magnet 26 are equal to each other. The center position Pfs and the center position Pb is a position (zero position), at which the density of the magnetic flux passing through the Hall element 33 becomes zero (0).

Figure 17:
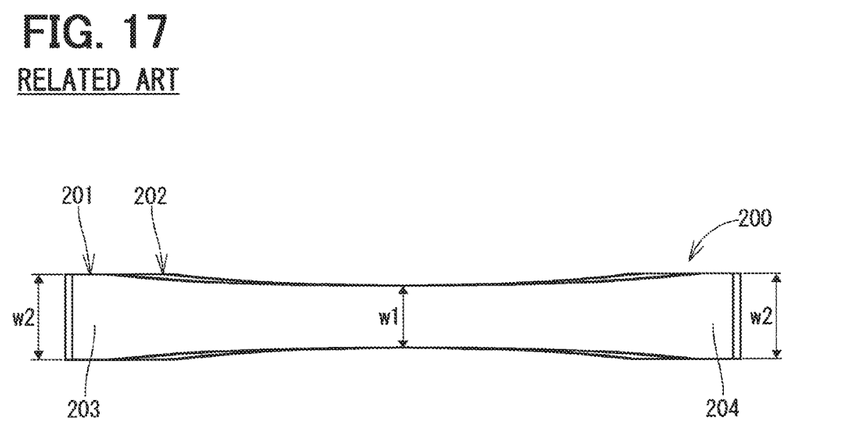
FIG. 17 is a view of a position sensing apparatus of a comparative example taken in a radial direction of a rotatable body, corresponding to FIG. 3 of the first embodiment of the present disclosure.

Now, advantages of the present embodiment will be discussed through comparison of the present embodiment and a comparative example. As shown in FIG. 17, a position sensing apparatus 200 of the comparative example has a first yoke 201 and a second yoke 202. When each of the first yoke 201 and the second yoke 202 is viewed in the opposing direction, a width of the yoke 201, 202 is progressively reduced from a width w2 at each of two end portions 203, 204 of the yoke 201, 202 to a width w1 at a center portion of the yoke 201, 202 in the rotational direction.

For the comparative purpose, the sizes of the yokes of the first embodiment and the sizes of the yokes of the comparative example are set to be comparative to each other. Specifically, the width b2 of each end portion 11, 12, 16, 17 of each yoke 10, 15 of the first embodiment is adjusted to be the same as the width w2 of each end portion 203, 204 of each yoke 201, 202 of the comparative example, and the width b1 of the intermediate portion 36, 36 of each yoke 10, 15 of the first embodiment and the width w1 of the center portion of each yoke 201, 202 of the comparative example are set to a predetermined width (width b1=width w1), which can provide a required resistance against the disturbance. In such a case, as indicated in FIG. 4, the amount of the leakage magnetic flux, which is leaked into the gap between the yokes, is increased in the present embodiment (see the characteristic line L1 indicated with a solid line in FIG. 4) in comparison to that of the comparative example (see a characteristic line L0 indicated with a dotted line in FIG. 4).

Now, advantages of the first embodiment will be described.

As discussed above, in the first embodiment, the width b1 of the intermediate portion 35, 36 of each of the first and second yokes 10, 15 is smaller than the width b2 of the end portions 11, 12, 16, 17 of the first and second yokes 10, 15 and is constant along the entire extent of the intermediate portion 35, 36 in the rotational direction.

With this construction, the amount of the leakage magnetic flux, which is present in the gap between the yokes, is increased in comparison to that of the comparative example. When the amount of the leakage magnetic flux, which is present in the gap between the yokes, is increased, the following advantages can be achieved.

(1) A ratio of the influence of the disturbance caused by the external magnetic field relative to the density of the magnetic flux, which is sensed with the Hall element 33, is reduced, so that the resistivity against the disturbance caused by the external magnetic field is improved.

(2) Signal amplification in a process of magneto-electric conversion at the Hall element 33 can be set to be relatively small, so that an influence of amplification of, for example, noises of an electric power source can be reduced, and thereby it is possible to limit variation of the output voltage of the Hall element 33 relative to its ideal voltage.

Thereby, according to the first embodiment, the reduction in the resistivity against the disturbance at the center portions of the first and second yokes 10, 15, which are centered in the rotational direction, is limited, and at the same time, the linearity of the output voltage V of the Hall element 33 (the linearity of the characteristic line L2) can be improved.

Furthermore, the shape of each of the first yoke 10 and the second yoke 15 is simpler in comparison to the comparative example discussed above, so that the designing and manufacturing of the yokes 10, 15 are eased.

Furthermore, according to the first embodiment, the intermediate range θb is set to be larger than the sensing range θfs and to include all of the sensing range θfs. Therefore, the sensing range θfs can be set to be the middle section of the intermediate range θb, which does not include the two end sections of intermediate range θb where the slope of the characteristic line L2 changes relatively largely. Therefore, the linearity of the characteristic line L2 in the sensing range θfs can be improved.

Furthermore, in the first embodiment, the intermediate range θb is set such that the output voltage difference (output signal difference) between the characteristic line L2 and the ideal straight line L3 is kept to be equal to or smaller than the predetermined value V1. Thus, in the sensing range θfs, the characteristic line L2 can be further approximated to the ideal straight line L3, and thereby the linearity of the characteristic line L2 can be further improved.

Second Embodiment

A position sensing apparatus according to a second embodiment of the present disclosure will be described with reference to FIGS. 6 and 7.

Figure 6:
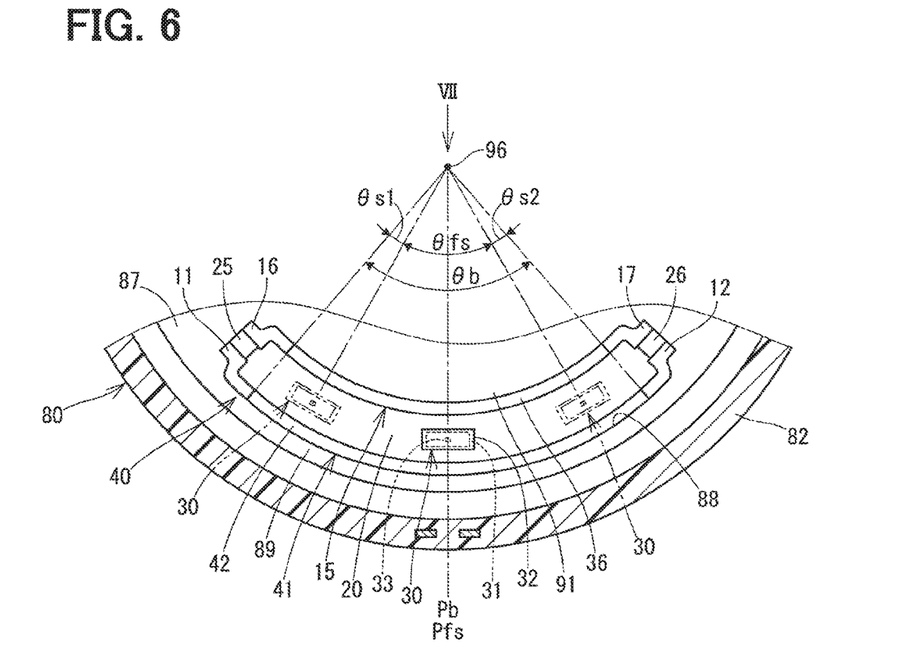
FIG. 6 is a partial enlarged cross-sectional view of a position sensing apparatus according to a second embodiment of the present disclosure.
Figure 7:
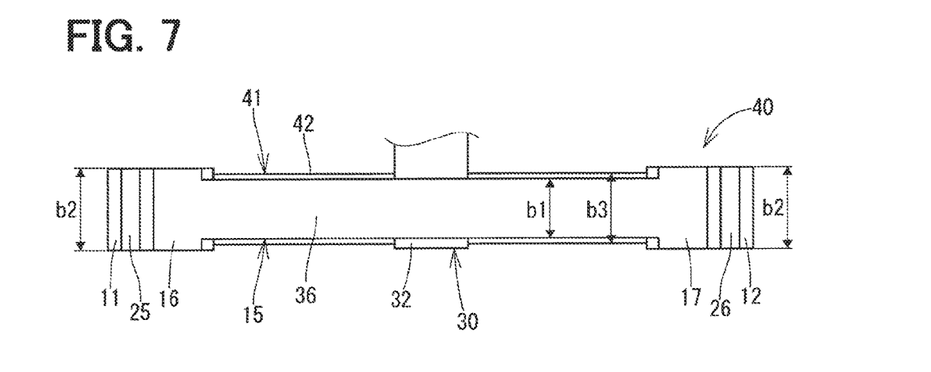
FIG. 7 is a view taken in a direction of an arrow VII in FIG. 6.

As shown in FIGS. 6 and 7, a first yoke 41 of the position sensing apparatus 40 includes an intermediate portion 42 between one end portion 11 and the other end portion 12 of the first yoke 41. When the first yoke 41 and the second yoke 15 are viewed in the opposing direction, the width b3 of the intermediate portion (first intermediate portion) 42 of the first yoke 41 and the width b1 of the intermediate portion (second intermediate portion) 36 of the second yoke 15 are different from each other.

Specifically, as shown in FIG. 7, the width b3 of the intermediate portion 42 of the first yoke 41 is larger than the width b1 of the intermediate portion 36 of the second yoke 15 and is smaller than the width b2 of the end portions 11, 12 of the first yoke 41. The width b1 and the width b3 are set such that the permeance of the first yoke 41 and the permeance of the second yoke 15 become equal to each other.

According to the second embodiment, the change in the magnetic field in the gap between the first yoke 41 and the second yoke 15 can be uniformly set in the opposing direction, so that the sensing accuracy can be improved. Furthermore, according to the second embodiment, the resistivity against the disturbance caused by the external magnetic field located on the radially outer side of the first yoke 41 can be improved.

Third Embodiment

A position sensing apparatus according to a third embodiment of the present disclosure will be described with reference to FIGS. 8 and 9.

Figure 8:
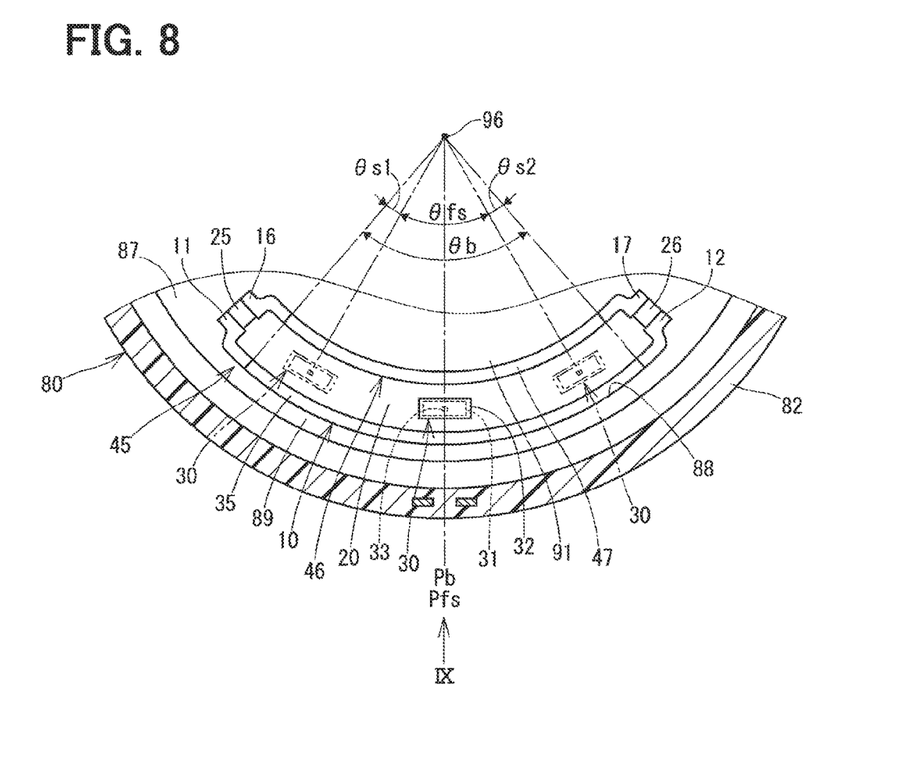
FIG. 8 is a partial enlarged cross-sectional view of a position sensing apparatus according to a third embodiment of the present disclosure.
Figure 9:
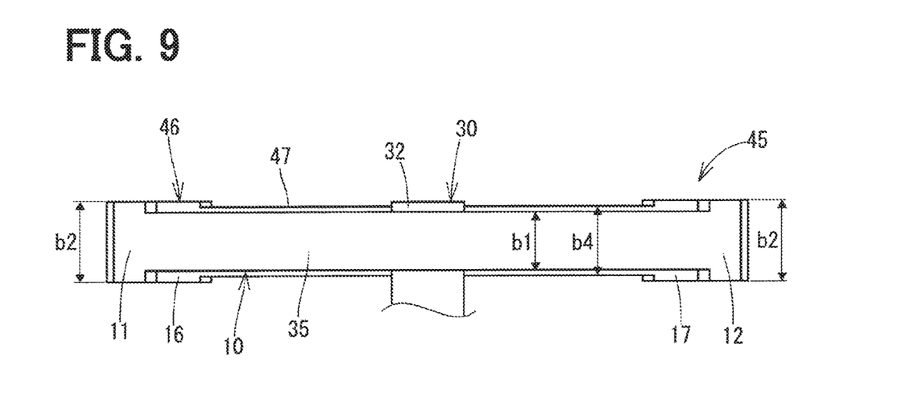
FIG. 9 is a view taken in a direction IX in FIG. 8.

As shown in FIGS. 8 and 9, a second yoke 46 of the position sensing apparatus 45 includes an intermediate portion 47 between one end portion 16 and the other end portion 17 of the second yoke 46. When the first yoke 10 and the second yoke 46 are viewed in the opposing direction, the width b1 of the intermediate portion (first intermediate portion) 36 of the first yoke 10 and the width b4 of the intermediate portion (second intermediate portion) 47 of the second yoke 46 are different from each other.

Specifically, as shown in FIG. 9, the width b4 of the intermediate portion 47 of the second yoke 46 is larger than the width b1 of the intermediate portion 35 of the first yoke 10 and is smaller than the width b2 of the end portions 16, 17 of the second yoke 46.

According to the third embodiment, the resistivity against the disturbance caused by the external magnetic field located on the radially inner side of the second yoke 46 can be improved.

Fourth Embodiment

A position sensing apparatus according to a fourth embodiment of the present disclosure will be described with reference to FIG. 10.

Figure 10:
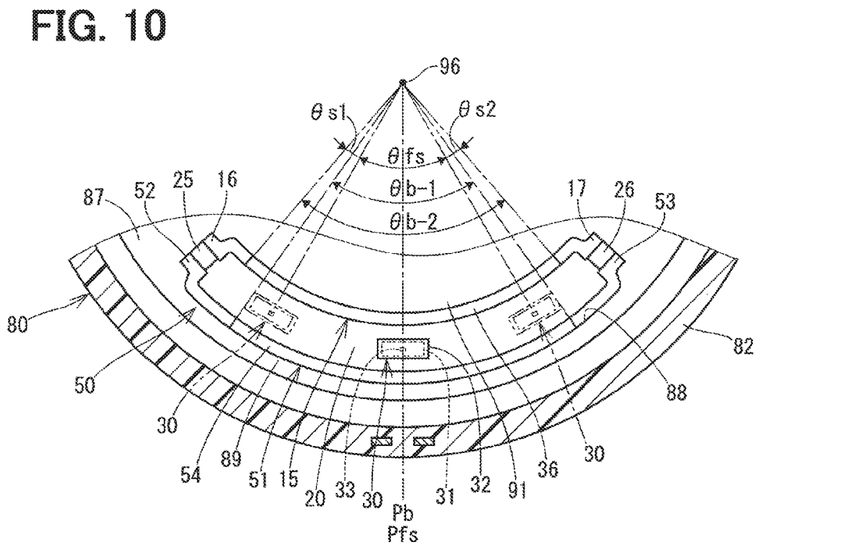
FIG. 10 is a partial enlarged cross-sectional view of a position sensing apparatus according to a fourth embodiment of the present disclosure.

As shown in FIG. 10, a first yoke 51 of the position sensing apparatus 50 includes an intermediate portion 54 between one end portion 52 and the other end portion 53 of the first yoke 51. A range, which is occupied by the intermediate portion (first intermediate portion) 54 of the first yoke 51 in the rotational direction, is different from a range, which is occupied by the intermediate portion (second intermediate portion) 36 of the second yoke 15 in the rotational direction.

Specifically, the range, which is occupied by the intermediate portion 54 of the first yoke 51 in the rotational direction, is defined as a first intermediate range θb-1. The range, which is occupied by the intermediate portion 36 of the second yoke 15 in the rotational direction, is defined as a second intermediate range θb-2. The first intermediate range θb-1 is smaller than the second intermediate range θb-2. The first intermediate range θb-1 and the second intermediate range θb-2 are set such that the permeance of the first yoke 51 and the permeance of the second yoke 15 become equal to each other.

According to the fourth embodiment, the change in the magnetic field in the gap between the first yoke 51 and the second yoke 15 can be uniformly set in the opposing direction, so that the sensing accuracy can be improved.

Fifth Embodiment

A position sensing apparatus according to a fifth embodiment of the present disclosure will be described with reference to FIG. 11.

Figure 11:
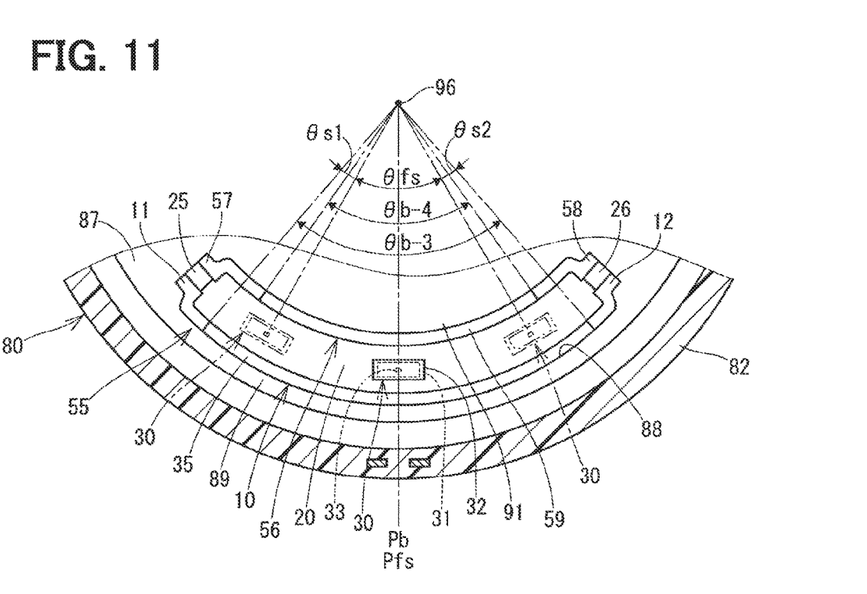
FIG. 11 is a partial enlarged cross-sectional view of a position sensing apparatus according to a fifth embodiment of the present disclosure.

As shown in FIG. 11, a second yoke 56 of the position sensing apparatus 55 includes an intermediate portion 59 between one end portion 57 and the other end portion 58 of the second yoke 56. A range, which is occupied by the intermediate portion (first intermediate portion) 35 of the first yoke 10 in the rotational direction, is different from a range, which is occupied by the intermediate portion (second intermediate portion) 59 of the second yoke 56 in the rotational direction.

Specifically, the range, which is occupied by the intermediate portion 35 of the first yoke 10 in the rotational direction, is defined as a first intermediate range θb-3. The range, which is occupied by the intermediate portion 59 of the second yoke 56 in the rotational direction, is defined as a second intermediate range θb-4. The second intermediate range θb-4 is smaller than the first intermediate range θb-3.

According to the fifth embodiment, the magnetic field in the gap between the first yoke 10 and the second yoke 56 can be different from that of the first embodiment, and thereby a degree of design freedom can be increased.

Sixth Embodiment

A position sensing apparatus according to a sixth embodiment of the present disclosure will be described with reference to FIG. 12.

Figure 12:
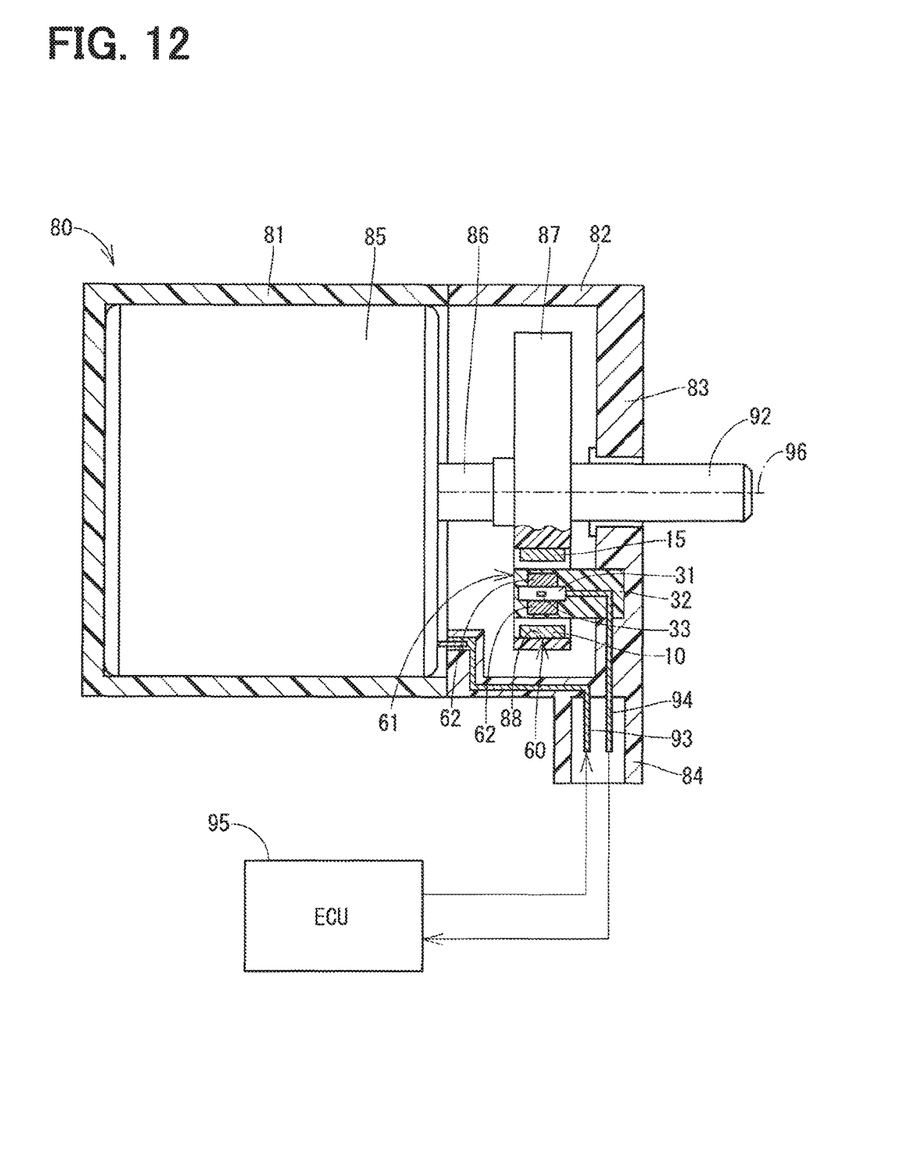
FIG. 12 is a schematic cross-sectional view of a rotational drive apparatus, in which a position sensing apparatus according to a sixth embodiment of the present disclosure is applied.

As shown in FIG. 12, a short-circuit magnetic path portion 61 of the position sensing apparatus 60 includes two magnetic flux collecting yokes 62, which are provided to collect and supply the leakage magnetic field (leakage magnetic flux) to the Hall IC 31. The two magnetic flux collecting yokes 62 are arranged one after another in the opposing direction while the Hall IC 31 is held between the two magnetic flux collecting yokes 62 in the gap 20.

According to the sixth embodiment, a dynamic range (a range of the output voltage V in the sensing range θfs) can be increased to improve the sensing accuracy.

Seventh Embodiment

Figure 13:
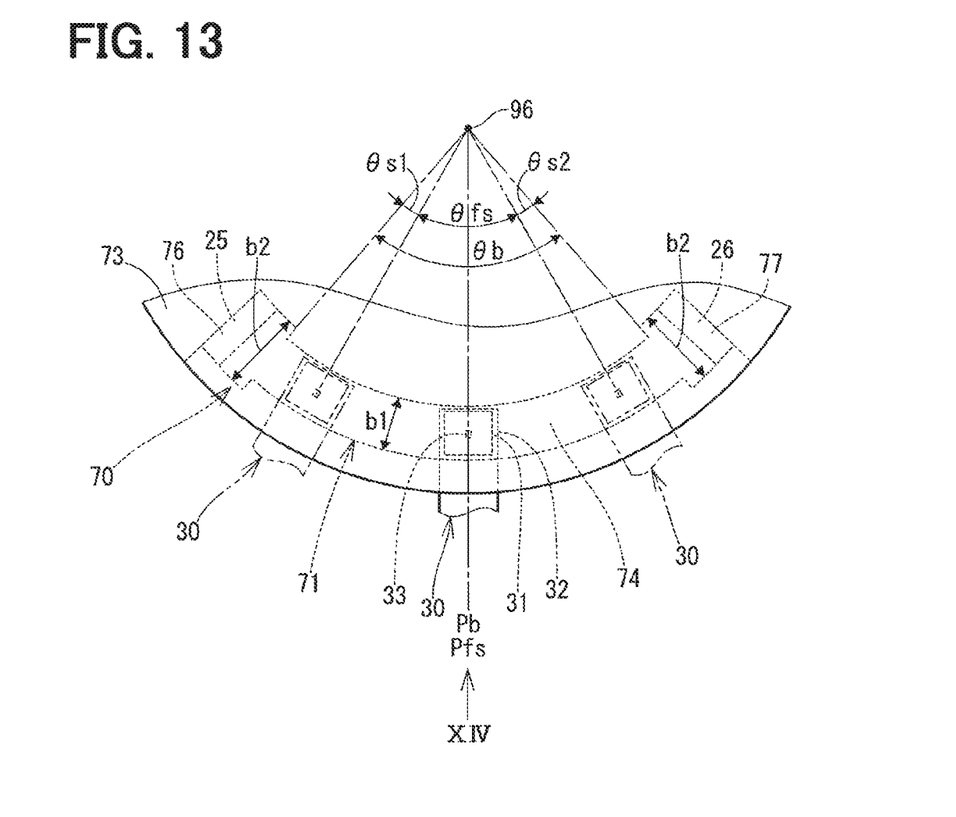
FIG. 13 is a partial enlarged schematic view of a position sensing apparatus according to a seventh embodiment of the present disclosure.

A position sensing apparatus according to a seventh embodiment of the present disclosure will be described with reference to FIGS. 13 and 14.

In the position sensing apparatus 70, the first yoke 71 and the second yoke 72 are opposed to each other in the axial direction of the rotatable body 73 and extend in the rotational direction of the rotatable body 73. In this way, the yokes 71, 72 and the magnets 25, 26 form a closed magnetic circuit, which opens on a radially outer side. The short-circuit magnetic path portion 30 is inserted into the closed magnetic circuit from the radially outer side of the rotatable body 73.

Even in this embodiment, as long as each of the width b1 of the intermediate portion 74 of the first yoke 71 and the width b1 of the intermediate portion 75 of the second yoke 72 is smaller than the width b2 of the end portions 76-79 of the yoke 71, 72 and is constant along the entire extent of the intermediate portion 74, 75 in the rotational direction, advantages, which are similar to those of the first embodiment, can be achieved.

Eighth Embodiment

Figure 15:
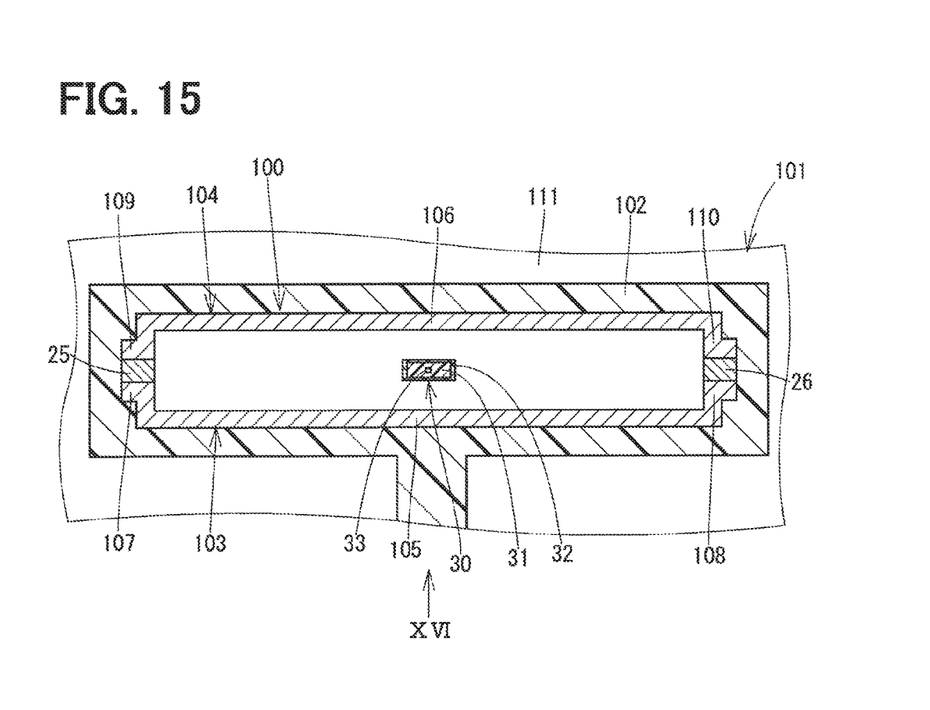
FIG. 15 is a partial enlarged cross-sectional view of a position sensing apparatus according to an eighth embodiment of the present disclosure.
Figure 16:
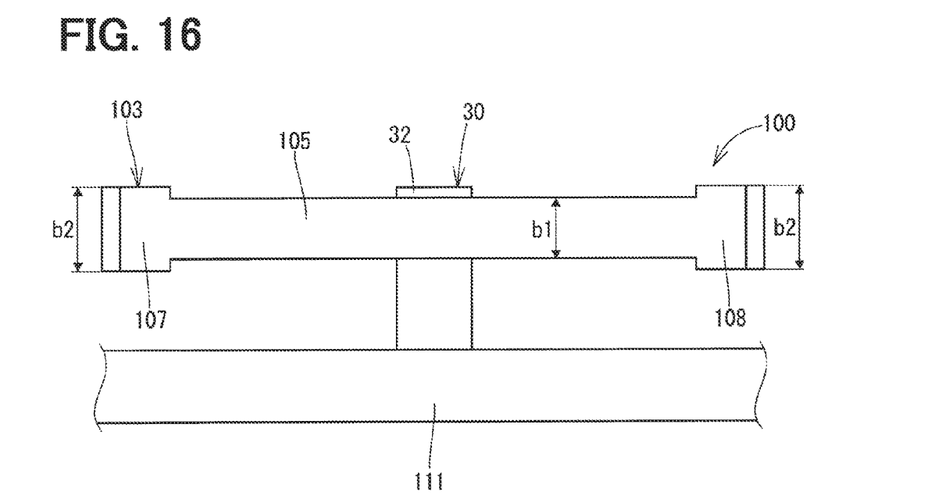
FIG. 16 is a view taken in a direction of an arrow XVI in FIG. 15.

A position sensing apparatus according to an eighth embodiment of the present disclosure will be described with reference to FIGS. 15 and 16. In FIG. 16, the output member 102 is not depicted for the sake of convenience.

The position sensing apparatus 100 is applied to a shift actuator 101. The shift actuator 101 is an actuator that is installed in a transmission, such as an automatically controlled manual transmission or a dual clutch transmission, to execute a shift operation and/or a select operation. An output member 102 of the shift actuator 101 linearly moves relative to a housing 111. The output member 102 serves as a sensing subject of the present disclosure, and the housing 111 serves as a reference member of the present disclosure.

In the position sensing apparatus 100, a first yoke 103, a second yoke 104, the first magnet 25 and the second magnet 26 form a closed magnetic circuit. The first yoke 103 and the second yoke 104 are respectively configured into a linear form extending in the moving direction of the output member 102 and are fixed to the output member 102.

Even in this embodiment where the position of the movable body (sensing subject), which is linearly moved relative to the reference member, is sensed, as long as each of the width b1 of the intermediate portion 105 of the first yoke 103 and the width b1 of the intermediate portion 106 of the second yoke 104 is smaller than the width b2 of the end portions 107-110 of the yoke 103, 104, advantages, which are similar to the advantages of the first embodiment, can be achieved.

Now, modifications of the above embodiments will be described.

In a modification of the above embodiment(s), the width of the one end portion and the width of the other end portion of the first yoke may be different from each other. Additionally or alternatively, the width of the one end portion and the width of the other end portion of the second yoke may be different from each other.

In another modification of the above embodiment(s), the members, which form the closed magnetic circuit, may be installed to the case, and the Hall IC may be installed to the rotatable body.

In another modification of the above embodiment(s), in place of the first magnet and the second magnet, any other type of magnetic flux generator(s) may be used.

In another modification of the above embodiment(s), the position sensing apparatus may be installed to another type of rotatable member, such as a final speed reducing member of a speed reducer, which is installed between the motor and the output shaft.

In another modification of the above embodiment(s), the rotational drive apparatus is not limited to be applied to the waste gate valve apparatus and may be applied to another apparatus, such as a variable vane control apparatus of a variable volume turbocharger, a valve drive apparatus of an exhaust throttle or an exhaust selector valve, or a valve drive apparatus of a variable intake mechanism.

The present disclosure is not limited the above embodiments and modifications thereof. That is, the above embodiments and modifications thereof may be further modified in various ways without departing from the principle of the present disclosure.

What is claimed is:

1. A position sensing apparatus for sensing a position of a sensing subject, which is rotatable about a rotational axis relative to a reference member, the position sensing apparatus comprising:
   a first magnetic flux conducting member that extends in a rotational direction of the sensing subject;
   a second magnetic flux conducting member that is placed on an inner side of the first magnetic flux conducting member in a radial direction of the sensing subject and extends in the rotational direction in parallel with the first magnetic flux conducting member, wherein the first magnetic flux conducting member and the second magnetic flux conducting member are installed to one of the reference member and the sensing subject;
   a first magnet that is placed between one end portion of the first magnetic flux conducting member and one end portion of the second magnetic flux conducting member;
   a second magnet that is placed between another end portion of the first magnetic flux conducting member, which is opposite from the one end portion of the first magnetic flux conducting member in the rotational direction, and another end portion of the second magnetic flux conducting member, which is opposite from the one end portion of the second magnetic flux conducting member in the rotational direction, wherein one of the first magnet and the second magnet has a south pole located on a radially inner side and a north pole located on a radially outer side, and the other one of the first magnet and the second magnet has a south pole located on the radially outer side and a north pole located on the radially inner side; and
   a magnetic flux density sensing device that is placed in a gap between the first magnetic flux conducting member and the second magnetic flux conducting member and is installed to the other one of the reference member and the sensing subject, wherein:
   the magnetic flux density sensing device outputs an output signal, which corresponds to a density of the magnetic flux that passes through the magnetic flux density sensing device;
   the first magnetic flux conducting member and the second magnetic flux conducting member are opposed to each other in a predetermined direction that is defined as an opposing direction;
   the first magnetic flux conducting member has a first intermediate portion that is located between the one end portion and the other end portion of the first magnetic flux conducting member;
   when the first magnetic flux conducting member is viewed in the opposing direction, a width of the first intermediate portion, which is measured in a direction parallel to the rotational axis, is smaller than a width of the one end portion and a width of the other end portion of the first magnetic flux conducting member, which are measured in the direction parallel to the rotational axis;
   the width of the first intermediate portion is constant along an entire extent of the first intermediate portion in the rotational direction;
   the second magnetic flux conducting member has a second intermediate portion that is located between the one end portion and the other end portion of the second magnetic flux conducting member;
   when the second magnetic flux conducting member is viewed in the opposing direction, a width of the second intermediate portion, which is measured in the direction parallel to the rotational axis, is smaller than a width of the one end portion and a width of the other end portion of the second magnetic flux conducting member, which are measured in the direction parallel to the rotational axis; and
   the width of the second intermediate portion is constant along an entire extent of the second intermediate portion in the rotational direction;
   an inner circumferential end of the one end portion of the first magnetic flux conducting member and an inner circumferential end of the one end portion of the second magnetic flux conducting member are inwardly spaced from the first magnet in a circumferential direction of the sensing subject; and
   an inner circumferential end of the other end portion of the first magnetic flux conducting member and an inner circumferential end of the other end portion of the second magnetic flux conducting member are inwardly spaced from the second magnet in the circumferential direction.

2. The position sensing apparatus according to claim 1, wherein:
   a sensing range is a range within which the position of the sensing subject is sensed in the rotational direction;
   a first intermediate range is a range that is occupied by the first intermediate portion of the first magnetic flux conducting member in the rotational direction;
   a second intermediate range is a range that is occupied by the second intermediate portion of the second magnetic flux conducting member in the rotational direction; and
   the first intermediate range and the second intermediate range are set to be larger than the sensing range and to include all of the sensing range.

3. The position sensing apparatus according to claim 2, wherein:
   a zero position is a position of the sensing subject, at which the density of the magnetic flux passing through the magnetic flux density sensing device becomes zero;
   a characteristic line is a graph line that indicates a relationship between the position of the sensing subject and the output signal of the magnetic flux density sensing device in an orthogonal coordinate system;
   a zero point is a coordinate that corresponds to the zero position and is located on the characteristic line;
   a target straight line is a graph line that extends through the zero point and has a target slope; and
   the first intermediate range and the second intermediate range are set such that an output signal difference between the characteristic line and the target straight line in the sensing range is kept to be equal to or smaller than a predetermined value.

4. The position sensing apparatus according to claim 1, wherein:
   a first intermediate range is a range that is occupied by the first intermediate portion of the first magnetic flux conducting member in the rotational direction;
   a second intermediate range is a range that is occupied by the second intermediate portion of the second magnetic flux conducting member in the rotational direction; and
   the first intermediate range is different from the second intermediate range.

5. The position sensing apparatus according to claim 1, wherein:

the first intermediate portion is radially outwardly displaced from the one end portion and the other end portion of the first magnetic flux conducting member; and the second intermediate portion is radially inwardly displaced from the one end portion and the other end portion of the second magnetic flux conducting member.

6. A rotational drive apparatus comprising:
an electric motor that has a motor shaft; and
the position sensing apparatus of claim 1, wherein:
the reference member is a case in which the position sensing apparatus is received;
the sensing subject is a rotatable body that is installed to the motor shaft and projects in the radial direction; and
the rotatable body and the motor shaft are rotatably received in the case.

7. The rotational drive apparatus according to claim 6, wherein:
the first magnetic flux conducting member and the second magnetic flux conducting member are installed to the rotatable body to rotate integrally with the rotatable body; and
the magnetic flux density sensing device is fixed to the case and is inserted into the gap in a direction parallel to a rotational axis of the motor shaft.

8. The position sensing apparatus according to claim 1, wherein an inner peripheral surface of the second intermediate portion, which is opposite from the first intermediate portion in the radial direction, is a continuous arcuate surface that extends continuously in a circumferential direction between the one end portion and the other end portion of the second magnetic flux conducting member.

9. The position sensing apparatus according to claim 1, wherein:
the one end portion of the first magnetic flux conducting member and the one end portion of the second magnetic flux conducting member are formed separately from each other and are connected together through the first magnet; and
the other end portion of the first magnetic flux conducting member and the other end portion of the second magnetic flux conducting member are formed separately from each other and are connected together through the second magnet.

10. The position sensing apparatus according to claim 1, wherein:
a radial extent of the first intermediate portion, which is measured in the radial direction, is constant along an entire circumferential extent of the first intermediate portion between the one end portion and the other end portion of the first magnetic flux conducting member; and
a radial extent of the second intermediate portion, which is measured in the radial direction, is constant along an entire circumferential extent of the second intermediate portion between the one end portion and the other end portion of the second magnetic flux conducting member.

11. The position sensing apparatus according to claim 1, wherein a width of the first magnet, which is measured in the direction parallel to the rotational axis, is the same as a width of the second magnet, which is measured in the direction parallel to the rotational axis.

12. The position sensing apparatus according to claim 1, wherein:
an amount of circumferential displacement between the inner circumferential end of the one end portion of the first magnetic flux conducting member and an inner circumferential end of the first magnet is larger than an amount of circumferential displacement between an outer circumferential end of the one end portion of the first magnetic flux conducting member and an outer circumferential end of the first magnet;
an amount of circumferential displacement between the inner circumferential end of the one end portion of the second magnetic flux conducting member and the inner circumferential end of the first magnet is larger than an amount of circumferential displacement between an outer circumferential end of the one end portion of the second magnetic flux conducting member and the outer circumferential end of the first magnet;
an amount of circumferential displacement between the inner circumferential end of the other end portion of the first magnetic flux conducting member and an inner circumferential end of the second magnet is larger than an amount of circumferential displacement between an outer circumferential end of the other end portion of the first magnetic flux conducting member and an outer circumferential end of the second magnet; and
an amount of circumferential displacement between the inner circumferential end of the other end portion of the second magnetic flux conducting member and the inner circumferential end of the second magnet is larger than an amount of circumferential displacement between an outer circumferential end of the other end portion of the second magnetic flux conducting member and the outer circumferential end of the second magnet.

13. The position sensing apparatus according to claim 1, wherein
the inner circumferential end of the one end portion of the first magnetic flux conducting member is radially outwardly displaced from an outer circumferential end of the one end portion of the first magnetic flux conducting member;
the inner circumferential end of the one end portion of the second magnetic flux conducting member is radially inwardly displaced from an outer circumferential end of the one end portion of the second magnetic flux conducting member;
the inner circumferential end of the other end portion of the first magnetic flux conducting member is radially outwardly displaced from an outer circumferential end of the other end portion of the first magnetic flux conducting member; and
the inner circumferential end of the other end portion of the second magnetic flux conducting member is radially inwardly displaced from an outer circumferential end of the other end portion of the second magnetic flux conducting member.

* * * * *